3,362,949
REACTIVE COPPER COMPLEX MONOAZO DYES CONTAINING PYRAZOLONE AND POLYHALO-PYRIMIDYLAMINO GROUPS
Jakob Benz, Oberwil, Basel-Land, Switzerland, and Kurt Brenneisen, Grenzach, Germany, assignors to Sandoz Ltd. (also known as Sandoz AG), Basel, Switzerland
No Drawing. Filed Dec. 14, 1964, Ser. No. 418,329
Claims priority, application Switzerland, Feb. 10, 1961, 1,622/61; Oct. 13, 1961, 11,908/61
7 Claims. (Cl. 260—147)

ABSTRACT OF THE DISCLOSURE

Dyestuffs having the formula

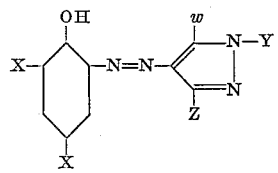

wherein $w$ is hydroxy or amino; $z$ is methyl, carboxyl or aminocarbonyl; Y is monosulfophenyl, lower alkyl-monosulfophenyl, lower alkoxymonosulfophenyl, chloro-monosulfophenyl, dichloromonosulfophenyl, lower alkylchloromonosulfophenyl, disulfophenyl, chloro disulfo-phenyl, lower alkyldisulfophenyl, lower alkoxy disulfophenyl, monosulfonaphthyl, disulfonaphthyl or trisulfonaphthyl; one X is —SO$_3$H and the other X is a polyhalopyrimidylamine group of the formula

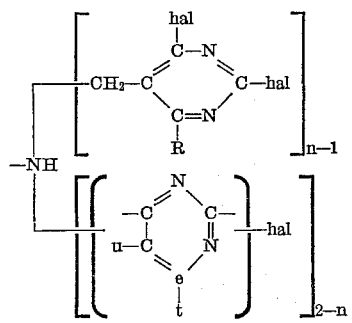

where R is hydrogen or methyl; $t$ is chlorine or bromine; $u$ is hydrogen, chlorine or bromine; hal is chlorine or bromine and $n$ is one of the integers 1 and 2 which are excellently suitable for the dyeing and printing of various fibers, and the resultant prints and dyeings are characterized by good properties, as hereinafter specified. For example, they yield perfect prints on fabrics of viscose staple fiber.

---

The present application is a continuation-in-part of our application Ser. No. 172,781, filed Feb. 12, 1962 (abandoned since the filing of the present application) and concerns the copper complex compounds of the dyes of the formula

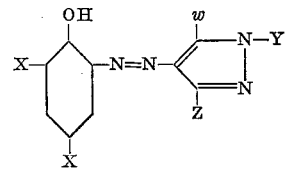

wherein $w$ is hydroxy or amino,
Z is methyl, carboxyl or aminocarbonyl,
Y is monosulfophenyl, lower alkylmonosulfophenyl, lower alkoxymonosulfophenyl, chloromonosulfophenyl, dichloromonosulfophenyl, lower alkyl-chloromonosulfophenyl, disulfophenyl, chlorodisulfophenyl, lower alkyl-disulfophenyl, lower alkoxy-disulfophenyl, monosulfonaphthyl, disulfonaphthyl or trisulfonaphthyl;

one X is —SO$_3$H, the second X is a polyhalopyrimidylamino group of the formula

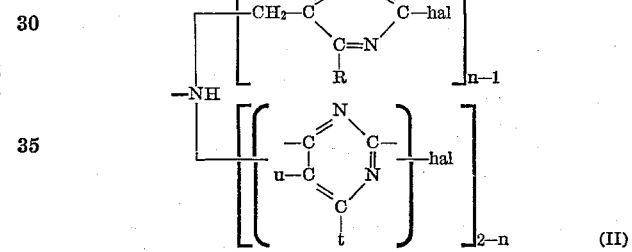

R is hydrogen or methyl,
$t$ is chlorine or bromine,
$u$ is hydrogen, chlorine or bromine,
hal is chlorine or bromine, and
$n$ is one of the integers 1 and 2.

The process for the production of these new reactive copper complex dyes comprises coupling 1 mol of the diazo compound of an amine of the formula

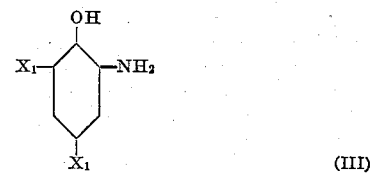

wherein one $X_1$ represents a sulfonic acid group,
and the other $X_1$ represents a nitro group, an acylamino group, e.g., an acetylamino group, or a polyhalopyrimidylamino group of the Formula II, with 1 mol of a coupling component of the formula

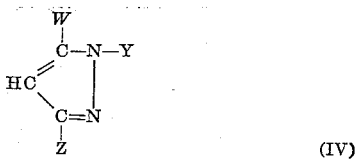

(IV)

wherein $w$, $Y$ and $Z$ have the aforecited meanings, upon which the substituent $X_1$, when necessary, is converted into an amino group by reduction when it is a nitro group or by hydrolysis when it is an acylamino group, and this amino group converted into a polyhalopyrimidylamino group of the Formula II and the resulting monoazo dye is treated with a copper-yielding agent, the conversion of $X_1$ into a polyhalopyrimidylamino group and the metallization being carried out in either order.

The process can be carried out by starting from a diazo component containing a polyhalopyrimidylamino group of Formula II and treating the resulting monoazo dye with a copper-yielding agent.

Another mode of operation of the process comprises starting from a diazo component containing a nitro group, reducing this nitro group in the monoazo dye formed, e.g., by heating in a solution of sodium sulfide or sodium hydrogen sulfide at 60–100° C., and treating the aminomonoazo dye either with a tri- or tetrahalopyrimidine and then with a copper-yielding agent or, alternatively, metallizing it first and then reacting with a tri- or tetrahalopyrimidine.

It is also possible to start from a diazo component containing an acylamino group (an acetylamino, propionylamino, formylamino, benzoylamino, carbomethoxyamino or carbethoxyamino group) and to hydrolyse this acylamino group in the resulting monoazo dye, e.g., by dissolving in 10 to 20 times its amount of concentrated sulfuric acid and diluting the solution with water to a sulfuric acid concentration of about 80% so that the temperature increases to about 100° C., or by heating in an aqueous mineral acid solution, preferably an aqueous 3 to 10% hydrochloric acid solution at 90–100° C., or in an aqueous solution of an alkali metal hydroxide, preferably a 5 to 10% sodium or potassium hydroxide solution, at 70 to 100° C. After hydrolysis, the aminomonoazo dye is reacted with a tri- or tetra-halopyrimidine as desired and then coppered, or first coppered and then reacted with a tri- or tetra-halopyrimidine.

When hydrolysis is effected under alkaline conditions, the acylaminomonoazo dye can be previously coppered since the copper complex compound is stable to alkali. If the coppered acylaminomonoazo dye is hydrolysed under acid conditions, however, or the coppered nitromonoazo dye reduced under demetallizing conditions, it must be subsequently coppered again.

The following tri- and tetra-halopyrimidines may be employed: 2,4,6-trichloropyrimidine and 2,4,6-tribromopyrimidine, 5-bromo-2,4,6-trichloropyrimidine, 2,4,5,6-tetrachloro- or 2,4,5,6-tetrabromopyrimidine, 2,4-dichloro-5 - chloromethyl - 6 - methyl-pyrimidine, 2,4 - dibromo-5-bromomethyl-6-methylpyrimidine, 2,4-dichloro-5-chloromethylpyrimidine and 2,4 - dibromo - 5 - bromomethylpyrimidine.

Condensation of the tri- and tetra-halopyrimidines is carried out to best advantages at temperatures between 40° and 100° C. and at pH values between 3 and 9. If temperatures higher than about 50° C. are necessary, it is advisable to work in reaction kettles equipped with reflux condensers in view of the volatility of certain halopyrimidines in water vapor. In order to maintain a constant pH value an acid-binding agent, e.g., sodium acetate or a phosphate buffer, is added to the reaction mixture at the start of the operation, or small portions of sodium or potassium carbonate or bicarbonate are added in solid, pulverized form or in aqueous solution during the reaction. Aqueous solutions of sodium or potassium hydroxide are also suitable as neutralizing agents. The addition of small amounts of a wetting or emulsifying agent to the reaction mixtures can accelerate the rate of reaction. The reaction is so controlled that only one halogen atom of the halopyrimidine reacts with an exchangeable hydrogen atom of the amino group.

Diazotization of the amine of Formula III is carried out by the direct or the indirect method at temperatures of, e.g., 0° to 10° C. The coupling reaction is carried out in a weakly acid, neutral or alkaline medium, preferably in the pH range of 6 to 12, and at low temperatures, e.g., 0° to 15° C., if necessary in the presence of organic bases such a spyridine or a mixture of pyridine bases.

The following are examples of suitable coupling components: 1-phenyl-3-methyl-5-pyrazolone-2'- or -3'- or -4'-sulfonic acid, 1-phenyl-3-methyl-5-pyrazolone-2', 4'- or 2',5'- or -3',5'-disulfonic acid, 1-(2'-chlorophenyl)-3-methyl-5-pyrazolone-4'- or -5'-sulfonic acid, 1-(2'-methylphenyl)-3-methyl-5-pyrazolone - 4' - sulfonic acid, 1-(2'-methylphenyl)-, 1-(2'-chlorophenyl)- or 1-(2'-methoxyphenyl) - 3 - methyl - 5 - pyrazolone-3',5'-disulfonic acid, 1-(2'-chloro-6'-methylphenyl) - 3 - methyl - 5-pyrazolone-4'-sulfonic acid, 1-(2',5' - dichlorophenyl) - 3 - methyl-5-pyrazolone-4'-sulfonic acid, 1-phenyl-3-carboxy-5-pyrazolone-4' - sulfonic acid, 1 - (2',5' - dichlorophenyl)-3-carboxy-5-pyrazolone-4'-sulfonic acid, 1-phenyl-3-aminocarbonyl-5-pyrazolone-4'-sulfonic acid, 1-(2'-naphthyl)-3-methyl-5-pyrazolone-5'-, or -6'-, or -7'-, or -8'-sulfonic acid, 1-(1'-naphthyl)-3-methyl-5-pyrazolone-4'-, -5'-, -6'- or -7'-sulfonic acid, 1-(2'-naphthyl)-3-methyl-5-pyrazolone-5',7'-, -4',7'-, -4',8'- or -6',8'-disulfonic acid, 1-(1'-naphthyl)-3-methyl-5-pyrazolone-3',6'-, -3',7'-, -4',6'-, -4',7'- or -5',7'-disulfonic acid, 1-(2'-naphthyl)-3-methyl-5 - pyrazolone - 3',6',8'- or -4',6',8' - trisulfonic acid, 1-phenyl-3-methyl-5-aminopyrazol-2',4'- or -2',5'-disulfonic acid, 1-phenyl-3-methyl-5-aminopyrazol-2'-, -3'- or -4'-sulfonic acid.

On completion of condensation or coupling the solution or suspension may be neutralized if desired, and the reactive dye is then salted out with sodium or potassium chloride or precipitated with acid, filtered with suction, washed and dried.

The monoazo dyes are converted into the corresponding copper complex dyes preferably in aqueous solution made weakly acid with acetic acid or weakly alkaline, at temperatures of 20–70° C. and with the addition of an aqueous solution of an alkali metal hydroxide, an alkali metal carbonate or an alkali metal salt of a low molecular aliphatic monocarboxylic acid. An amount of the copper-yielding agent containing 1 atom of copper is allowed to act upon 1 molecule of the dye.

The copper complex compounds thus formed are separated from the aqueous medium by the addition of salt, and then filtered off, washed if necessary, and dried.

The new copper-containing reactive dyes are suitable for the dyeing of leather; for the dyeing, padding and printing of fibers of animal origin, e.g. wool and silk; synthetic polyamide fibers, e.g. nylon; cellulosic fibers, e.g. cotton and linen; regenerated cellulosic fibers, e.g. viscose filament yarn, viscose staple fiber and cuprammonium rayon; and blends and articles made of these fibers. The optimum conditions of application vary with the type of fiber and the dyes used. The new copper-containing reactive dyes which contain 3 or more sulfonic acid groups possess good solubility in water, good stability in printing pastes and padding liquids, good compatibility with salts and hard water, good reactivity with vegetable fibers, animal and synthetic polyamide fibers, are insensitive to heavy metal ions such as those of copper, iron and chromium, and reserve acetate, triacetate, polyester, polyacrylonitrile, polyvinyl chloride, polyvinyl acetate and polyalkylene fibers. They have only moderate substantivity, thanks to which the unfixed portion of dye can be easily removed from dyeings and prints on cellulosic fibers by washing.

The copper-containing dyes which contain 2 sulfonic acid groups are especially suitable for the exhaustion dyeing of cellulosic fibers and for the dyeing of wool, silk and synthetic polyamide fibers from weakly acid medium. Some of the dyes with only 2 sulfonic acid groups, e.g. those which contain a substituent (Cl, $CH_3$ or the $SO_3H$ group itself) in at least one of the 2'- and 6'-positions of the phenyl nucleus of the pyrazolone, are also well suitable for padding and printing. Animal fibers and synthetic polyamide fibers are dyed, printed or fixed preferably from a weakly acid, neutral or weakly alkaline medium, e.g. in presence of acetic acid, ammonium sulfate, sodium metaphosphate, etc.

Dyeing can also be carried out in an acetic acid to neutral medium in the presence of levelling agents, e.g. polyoxyethylated fatty amines or mixtures of these and alkylpolyglycol ethers, the bath being adjusted to a neutral or weakly alkaline reaction at the end of the dyeing process by the addition of small amounts of an agent of alkaline reaction, e.g. ammonia, sodium carbonate or bicarbonate, etc., or compounds which react alkaline on heating, e.g. hexamethylene-tetramine or urea. Subsequently the goods are rinsed thoroughly and scoured if necessary with a little acetic acid.

The dyeings and prints obtained have good fastness to light, washing, perspiration, milling, water, sea water, potting, weak acids, alkalis, rubbing, gas fumes, chlorinated swimming pool water, bleaching (peroxide), and dry cleaning (organic solvents).

The dyeing, padding and printing or fixation of the dye on cellulosic fibers is best carried out in alkaline medium, e.g. in presence of sodium carbonate or bicarbonate, sodium or potassium hydroxide solution, sodium metasilicate, sodium borate, trisodium phosphate, ammonia, etc. To prevent reduction effects in dyeing, padding or printing, it is often of advantage to use a mild oxidizing agent such as sodium 3-nitro-benzene-1-sulfonate. The fixation of the dyes on cellulosic fibers also is generally carried out with heating. The dyes can also be dyed or fixed at lower temperatures, e.g. 20° to 40° C., provided that strong alkalis such as sodium hydroxide or metasilicate are employed and the fixation is allowed to proceed for a sufficiently long time, e.g. from about 5 to about 50 hours.

The addition of certain quaternizable amines such as trimethyl-amine or triethylene-diamine, or of the asymmetrical dimethyl-hydrazine, preferably in stoichiometric amounts, accelerates the fixation of the dye on the fiber so that the fixing temperature can be reduced and/or the fixing time shortened.

The dyeings and prints on cellulosic fibers are characterized by good stability to resin crease-resistant finishes and to alkaline or weakly acid hydrolytic influences and also by outstanding wet fastness properties (fastness to washing, perspiration, water, sea water, rubbing, alkali, vulcanizing, chlorinated swimming pool water, bleaching and dry cleaning). These good properties are due to the formation of a stable chemical linkage between the dye molecule and the cellulose molecule. Often the entire amount of dye applied does not take part in the reaction with the fiber. In such cases the unreacted dye is removed from the fiber by suitable treatment such as washing and/or soaping, if necessary at higher temperatures, for which purpose synthetic detergents can be used, e.g. alkylarylsulfonates, e.g. sodium dodecylbenzenesulfonate, alkylsulfates, e.g. sodium lauryl sulfate, alkylpolyglycol ethers, as well as mono- and dialkylphenylpolyglycol ethers, which may be sulfated or carboxymethylated.

The copper complex compounds of the present invention yield printing pastes which applied on viscose staple fibers give brown prints with sharp edges and perfectly white unprinted areas, whereas the 1:2 cobalt complex compounds of the same monoazo dyes, e.g. the dye described in French Patent No. 1,221,621 as Example 182, yield printing pastes which applied on viscose staple fibers give brown prints with blurred edges and unprinted areas showing a brownish stain at the border of the printed areas.

In the following examples the parts and percentages are by weight and the temperatures in degrees centigrade.

*Example 1*

234 parts of 2-amino-6-nitro-1-hydroxybenzene-4-sulfonic acid are dissolved in 1000 parts of water with the addition of 134 parts of 30% sodium hydroxide solution at 65° and pH 5.0. 218 parts of 2,4,5,6-tetrachloropyrimidine are added with good stirring and condensed at 65°. During condensation the pH value is maintained between 4.5 and 5.0 by dropwise addition of 20% sodium carbonate solution. After 2 hours condensation is completed and a proportion of the condensation product precipitated in crystalline form.

The warm condensation mass is added with stirring in the course of 1 hour at 10–20° to a suspension of 300 parts of iron powder in 700 parts of 20% acetic acid, and stirring continued for 30 minutes at 20°. The precipitate consisting of the reaction product and iron waste products is filtered off and washed with a little dilute acetic acid. It is then dispersed in 1500 parts of water at 10°, 270 parts of 30% sodium hydoxide solution are added to the dispersion and after being stirred for a short time it is filtered. The filtrate is adjusted acid to Congo red indicator with 350 parts of 30% hydrochloric acid, and the precipitate filtered off.

385 parts of the amine thus obtained are stirred into 1000 parts of water. 150 parts of 30% sodium hydroxide solution and a solution of 70 parts of sodium nitrite in 250 parts of water are added, and the resulting solution added dropwise with stirring at 0–5° to 400 parts of 20% hydrochloric acid in the course of 2 hours. The diazo suspension so formed is added at 0–5° to a solution of 335 parts of 1-phenyl-3-methyl-5-pyrazolone-2'-4'-disulfonic acid and 200 parts of sodium carbonate in 2000 parts of water. On completion of coupling, 1000 parts of a 16% copper sulfate solution are added to the dye solution at 60° and pH 5.0. The copper containing dye formed is salted out with sodium chloride, filtered off and dried with vacuum. It is a red-brown powder which dissolves in water to give yellow-brown solutions.

Mercerised cotton sateen is printed with a paste of the following composition:

|  | Parts |
| --- | --- |
| Dye produced as described above | 30 |
| Urea | 100 |
| Water | 395 |
| 3% sodium alginate thickening | 450 |
| Sodium 1-nitrobenzene-3-sulfonate | 10 |
| Sodium carbonate | 15 |
|  | 1000 |

The print is dried, steamed for 10–15 minutes at 102–104°, rinsed in cold and warm water, soaped at the boil, rinsed again and dried. A yellow-brown print of very good wet fastness and outstanding light fastness is obtained.

*Example 2*

234 parts of 2-amino-6-nitro-1-hydroxybenzene-4-sulfonic acid are dissolved in 1000 parts of water and diazotized by the addition of 145 parts of 30% hydrochloric acid and 292 parts of 4 N sodium nitrite solution at 0–5°. The suspension formed is added at 5° to a well stirred solution of 276 parts of sodium 1-phenyl-3-methyl-5-pyrazolone-2'-sulfonate and 110 parts of anhydrous sodium carbonate in 1000 parts of water. On completion of coupling the monoazo dye is salted out, filtered with suction, and washed with dilute sodium chloride solution.

The paste of the nitromonoazo dye is dissolved in 1500 parts of water at 60°. About 750 parts of 27% sodium hydrogen sulfide solution are added to the solution, which is then brought to the boil and held at about 100° for 1 hour. The pH value of the solution is about 10–11. When the reaction is completed, 850 parts of 30% hydrochloric acid are dropped in at about 90°. The sodium thiosulfate present in the solution decomposes to give sulfur dioxide which escapes and sulfur which separates. The suspended sulfur is filtered off at 90°, and the aminomonoazo dye in the filtrate is salted out, filtered off and washed with a dilute sodium chloride solution.

From the resulting paste, an amount equivalent to 245 parts of the aminomonoazo dye (calculated as 100% free acid) is dissolved in 1500 parts of warm water, 125 parts of crystallized copper sulfate are added and the temperature brought to 50–55° and the pH value to 5 by the addition of solid sodium carbonate. Stirring is continued at 50° until metallization is complete, then 110 parts of 2,4,5,6-tetrachloropyrimidine are added in one lot and condensed at 70–80°. The pH value is maintained between 5.0 and 6.0 during condensation by dropwise addition of 20% sodium carbonate solution. After stirring for 2 hours condensation is completed. The dye is salted out, filtered with suction, washed with a dilute sodium chloride solution and dried with vacuum at about 60°. A red-brown powder is obtained which dissolves in water with a brown coloration.

2 parts of this dye are dissolved in 4000 parts of cold water, the solution is heated to 40° and a dyebath prepared with 2 parts of acetic acid and 3 parts of a mixture of a polyoxyethylated fatty amine and an alkylpolyglycol ether. 100 parts of a wool fabric are entered, the bath brought to the boil in 20 minutes and maintained at the boil for 60 minutes. Then, at 85–90°, about 3 parts of 25% ammonia or 3 parts of hexamethylene-tetramine are added and treatment continued for 20 minutes at 90°. The dyed fabric is rinsed well with a little acetic acid in a large quantity of rinsing water, and dried. A level brown dyeing fast to washing, perspiration, water and milling and of good light fastness is obtained.

Example 3

A suspension of 24.6 parts of 2-amino-1-hydroxy-6-acetylaminobenzene-4-sulfonic acid in 100 parts of water, 100 parts of ice and 5 parts of 30% hydrochloric acid is diazotized by the addition of 29.5 parts of 4 N sodium nitrite solution at 3–5°. Subsequently, 38 parts of sodium 1-phenyl-3-methyl-5-pyrazolone-2′, 5′-disulfonate and 10 parts of sodium carbonate are gradually added at 10–15°, and stirring continued for 4 hours to complete the coupling reaction. The acetylaminomonoazo dye is precipitated by acidifying with 20–25 parts of 30% hydrochloric acid (pH 0.5–1.0) and salting out, and is filtered with suction and washed with sodium chloride solution. The moist filter residue is entered into 150 parts of 10% hydrochloric acid and heated at 90–100° until the acetyl group is split off. The hydrolysing solution is allowed to cool to about 60°, then 25 parts of crystallized copper sulfate are added, followed, at 50–55°, by sufficient 30% sodium hydroxide solution to bring the pH value to 5. The solution is stirred for 1 hour at 50–55° with the addition of 20% sodium carbonate solution as required to keep the pH between 5 and 6. 22 parts of finely pulverized 2,4,5,6-tetrachloropyrimidine are added, the reaction mixture heated with reflux to 70–80° and stirred at about 75–80° with gradual addition of dilute sodium carbonate solution to give a constant weakly acid reaction. After 2 to 3 hours the solution is boiled without reflux condensing causing a small amount of unreacted tetrachloropyrimidine to be eliminated. Then the dye is salted out with sodium chloride and filtered with suction, dried with vacuum at 80–100° and ground to give a dark powder which dissolves in water with a brown-red coloration.

A mercerized cotton fabric is padded with a warm (about 40°), neutral solution containing 3% of the above-described copper complex dye and 1% of sodium 3-nitrobenzene-1-sulfonate and squeezed to give an increase of about 85% over the dry weight. It is dried and treated for about 45 minutes with continuous movement in a fixing bath at 80–90° prepared with 250 parts of anhydrous sodium sulfate and 30 parts of sodium carbonate per 1000 parts of the solution. The liquor ratio for fixation may be 1:10 to 1:50. The fabric is subsequently rinsed well with cold water, soaped at the boil, rinsed again and dried. The yellow brown dyeing obtained has excellent light and wet fastness.

A printing paste of the composition:

| | Parts |
|---|---|
| Copper complex dye | 30 |
| Urea | 200 |
| 3% sodium alginate thickening | 450 |
| Calcined sodium carbonate | 15 |
| Sodium 3-nitrobenzene-1-sulfonate | 15 |
| Water | 290 |
| Total | 1000 | is printed at room temperature on a fabric of viscose staple fiber. The print is dried, steamed for 10 minutes at 102°–104°, rinsed in cold and in warm water, soaped at the boil for 20 minutes in a solution of 0.1% soap in distilled water, rinsed again and dried. The obtained yellow brown print presents sharp edges and perfectly white unprinted areas and shows excellent fastness properties to wet treatments and to light.

Example 4

47 parts of the aminomonoazo dye obtained by coupling diazotized 2-amino-1-hydroxy-4-carbethoxyaminobenzene-6-sulfonic acid and 1-phenyl-3-methyl-5-pyrazolone-3′-sulfonic acid with subsequent alkaline saponification of the carbethoxyamino group, are dissolved in 600 parts of water at 80°. With vigorous stirring and reflux condensing, a solution of 22 parts of 2,4,5,6-tetrachloropyrimidine in 200 parts of acetone is added dropwise and the mixture stirred further at 60–65° with the addition of dilute sodium carbonate solution to maintain a constant weakly acid reaction. After 2 to 3 hours the reflux condenser is removed and the acetone and a small amount of unreacted tetrachloropyrimidine distilled off by boiling the solution and condensing the vapor.

A solution of 25 parts of crystallized copper sulfate in 250 parts of water is dropped slowly at 70–80° into the solution of the condensation product. Simultaneously, dilute sodium carbonate solution is run in to maintain a constant pH value of 6.0 to 6.5. On completion of metallization the dye is salted out by the addition of sodium chloride, filtered with suction and dried at 80–100° with vacuum. It is then ground to give a dark powder which dissolves in water with a brown-red coloration.

1.5 parts of the dye obtained in this way are dissolved in 3000 parts of soft water at 40°. 100 parts of mercerized cotton sateen are entered in this dyebath, then 75 parts of calcined sodium sulfate are added and it is heated to 90° in 15 minutes. A further 75 parts of calcined sodium sulfate and 60 parts of calcined sodium carbonate are added. Dyeing is continued for 1 hour at 90°, then the fabric is rinsed with cold and hot water, soaped at the boil for 10–20 minutes in a solution of 2 g./l of an alkylpolyglycol ether sulfate, rinsed again and dried. A reddish brown dyeing fast to light and wet treatments is obtained.

The following table contains further copper complex compounds of monoazo dyes of the formula

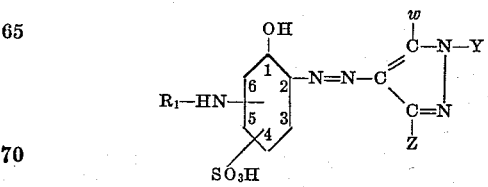

which are obtainable according to the particulars of Examples 1 to 4 and are characterized by the symbols $R_1$, $w$, Y, Z, the positions of $R_1$—NH— and —$SO_3H$, and the shade of the dyeing on cotton.

| Example No. | $R_1$= Radical of— I | Positions of— $R_1$—NH— II | Positions of— —SO$_3$H III | w IV | z V | Y VI | Shade on Cotton |
|---|---|---|---|---|---|---|---|
| 5 | 2,4,6-trichloropyrimidine | 6 | 4 | —OH | —CH$_3$ | 4-sulfophenyl | Yellow-brown. |
| 6 | 2,4,6-tribromopyrimidine | 6 | 4 | —OH | —CH$_3$ | do | Do. |
| 7 | 2,4,5,6-tetrachloropyrimidine | 6 | 4 | —OH | —CH$_3$ | 4-sulfonaphthyl-1- | Do. |
| 8 | 2,4,6-trichloropyrimidine | 4 | 6 | —OH | —CH$_3$ | do | Red-brown. |
| 9 | do | 4 | 6 | —OH | —CH$_3$ | 3-sulfophenyl | Do. |
| 10 | 2,4,5,6-tetrachloropyrimidine | 6 | 4 | —OH | —CH$_3$ | 2-methyl-4-sulfophenyl | Yellow-brown. |
| 11 | do | 6 | 4 | —OH | —CH$_3$ | 4-sulfophenyl | Do. |
| 12 | do | 6 | 4 | —OH | —CH$_3$ | 3-sulfophenyl | Do. |
| 13 | do | 6 | 4 | —OH | —CH$_3$ | 2-chloro-4-sulfophenyl | Do. |
| 14 | do | 6 | 4 | —OH | —CH$_3$ | 2,5-dichloro-4-sulfophenyl | Do. |
| 15 | do | 6 | 4 | —OH | —CH$_3$ | 2-chloro-6-methyl-4-sulfophenyl | Do. |
| 16 | do | 6 | 4 | —OH | —COOH | 4-sulfophenyl | Red-brown. |
| 17 | 2,4,6-trichloropyrimidine | 6 | 4 | —OH | —CH$_3$ | 2,5-disulfophenyl | Yellow-brown. |
| 18 | 2,4,5,6-tetrachloropyrimidine | 6 | 4 | —NH$_2$ | —CH$_3$ | do | Do. |
| 19 | do | 6 | 4 | —OH | —COOH | 5,7-disulfonaphthyl-2- | Red-brown. |
| 20 | do | 6 | 4 | —OH | —CO—NH$_2$ | do | Do. |
| 21 | 2,4,6-tribromopyrimidine | 6 | 4 | —OH | —CH$_3$ | 2,5-disulfophenyl | Yellow-brown. |
| 22 | 2,4,5,6-tetrabromopyrimidine | 6 | 4 | —OH | —CH$_3$ | 2,5-disulfophenyl | Do. |
| 23 | do | 6 | 4 | —OH | —CH$_3$ | 4,6,8-trisulfonaphthyl-2- | Do. |
| 24 | 6-methyl-2,4-dichloro-5-chloromethyl-pyrimidine | 6 | 4 | —OH | —CH$_3$ | 2,5-disulfophenyl | Do. |
| 25 | do | 6 | 4 | —OH | —CH$_3$ | 6,8-disulfonaphthyl-2- | Do. |
| 26 | 2,4,6-trichloropyrimidine | 4 | 6 | —OH | —CH$_3$ | 3,6-disulfonaphthyl-1- | Red-brown. |
| 27 | do | 6 | 4 | —OH | —CH$_3$ | 5-sulfo-naphthyl-1- | Do. |
| 28 | do | 6 | 4 | —OH | —CH$_3$ | 5-sulfo-naphthyl-2- | Yellow-brown. |
| 29 | do | 6 | 4 | —OH | —COOH | 3,5-disulfophenyl | Red-brown. |
| 30 | 2,4-dibromo-5-bromomethyl-6-methyl-pyrimidine | 6 | 4 | —OH | —CH$_3$ | do | Yellow-brown. |
| 31 | 2,4-dichloro-5-chloromethylpyrimidine | 6 | 4 | —OH | —COOH | 2,5-dichloro-4-sulfophenyl | Red-brown. |
| 32 | do | 4 | 6 | —OH | —COOH | 4-sulfophenyl | Do. |
| 33 | 2,4,6-trichloropyrimidine | 6 | 4 | —OH | —CH$_3$ | 7-sulfo-naphthyl-1- | Yellow-brown. |
| 34 | 2,4,6-tribromopyrimidine | 6 | 4 | —OH | —CH$_3$ | 3,6,8-trisulfonaphthyl-2- | Do. |
| 35 | 2-4-dibromo-5-bromomethylpyrimidine | 6 | 4 | —OH | —CH$_3$ | 4,7-disulfonaphthyl-1- | Do. |
| 36 | 2,4,6-trichloropyrimidine | 6 | 4 | —NH$_2$ | —CH$_3$ | 2-sulfophenyl | Do. |
| 37 | 2,4,5,6-tetrachloropyrimidine | 6 | 4 | —NH$_2$ | —CH$_3$ | 2,4-disulfophenyl | Do. |
| 38 | 2,4,5,6-tetrachloropyrimidine | 6 | 4 | —NH$_2$ | —CH$_3$ | 3-sulfophenyl | Do. |
| 39 | do | 4 | 6 | —NH$_2$ | —CH$_3$ | do | Red-brown. |
| 40 | do | 4 | 6 | —OH | —CH$_3$ | 2-chloro-3,5-disulfophenyl | Do. |
| 41 | 2,4,6-trichloropyrimidine | 6 | 4 | —OH | —CH$_3$ | do | Yellow-brown. |
| 42 | 2,4,6-tribromopyrimidine | 6 | 4 | —OH | —CH$_3$ | do | Do. |
| 43 | 2,4,6-trichloropyrimidine | 6 | 4 | —OH | —CO—NH$_2$ | 2,5-disulfophenyl | Red-brown. |
| 44 | 2,4,5,6-tetrachloropyrimidine | 6 | 4 | —OH | —CH$_3$ | 3,7-disulfonaphthyl-1- | Yellow-brown. |
| 45 | do | 6 | 4 | —OH | —CH$_3$ | 4,6,8-trisulfonaphthyl-2- | Do. |
| 46 | 2,4,6-trichloropyrimidine | 6 | 4 | —OH | —CH$_3$ | 4,8-disulfonaphthyl-2- | Do. |
| 47 | do | 4 | 6 | —OH | —CH$_3$ | 2-methyl-3,5-disulfophenyl | Red-brown. |
| 48 | 2,4-dichloro-5-chloromethyl-6-methyl-pyrimidine | 6 | 4 | —OH | —COOH | do | Do. |
| 49 | do | 6 | 4 | —OH | —CH$_3$ | 4,6-disulfonaphthyl-1- | Yellow-brown. |
| 50 | 2,4,6-trichloropyrimidine | 6 | 4 | —OH | —CH$_3$ | 6-sulfonaphthyl-1- | Do. |
| 51 | do | 6 | 4 | —OH | —CH$_3$ | 8-sulfonaphthyl-2- | Do. |
| 52 | 2,4,5,6-tetrachloropyrimidine | 4 | 6 | —OH | —COOH | 6-sulfonaphthyl-2- | Red-brown. |
| 53 | 2,4,6-trichloropyrimidine | 6 | 4 | —OH | —COOH | 2-chloro-5-sulfophenyl | Do. |
| 54 | do | 6 | 4 | —NH$_2$ | —CH$_3$ | do | Yellow-brown. |
| 55 | 2,4,6-tribromopyrimidine | 6 | 4 | —OH | —CH$_3$ | 2-chloro-6-methyl-4-sulfophenyl | Do. |
| 56 | 2,4,6-trichloropyrimidine | 6 | 4 | —OH | —CO—NH$_2$ | 2-methoxy-3,5-disulfophenyl | Red-brown. |
| 57 | 2,4,5,6-tetrachloropyrimidine | 6 | 4 | —OH | —CO—NH$_2$ | do | Do. |
| 58 | do | 4 | 6 | —OH | —CO—NH$_2$ | 2,5-disulfophenyl | Do. |
| 59 | do | 4 | 6 | —NH$_2$ | —CH$_3$ | do | Do. |
| 60 | do | 6 | 4 | —OH | —CO—NH$_2$ | 4-sulfophenyl | Do. |
| 61 | do | 6 | 4 | —OH | —COOH | do | Do. |
| 62 | do | 4 | 6 | —OH | —CH$_3$ | 2,5-disulfophenyl | Do. |
| 63 | do | 6 | 4 | —NH$_2$ | —CH$_3$ | 4-sulfophenyl | Yellow-brown. |
| 64 | do | 6 | 4 | —OH | —CH$_3$ | 2-ethyl-4-sulfophenyl | Do. |
| 65 | do | 6 | 4 | —OH | —CH$_3$ | 2-ethyl-3,5-disulfophenyl | Do. |
| 66 | do | 6 | 4 | —OH | —CH$_3$ | 2-ethoxy-3,5-disulfophenyl | Do. |
| 67 | 5-bromo-2,4,6-trichloropyrimidine | 6 | 4 | —OH | —CH$_3$ | 2,5-disulfophenyl | Do. |
| 68 | do | 4 | 6 | —OH | —CH$_3$ | do | Red-brown. |

Formulae of representative dyes of the foregoing examples are as follows:

*Example 1*

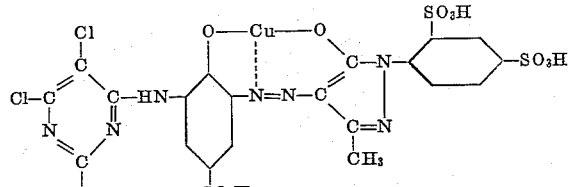

*Example 2*

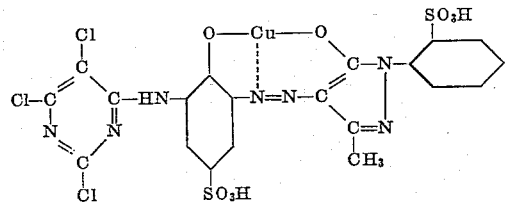

*Example 3*

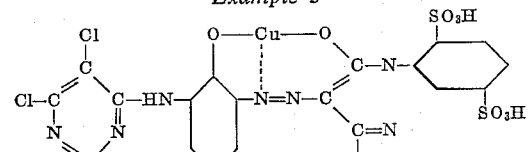

*Example 4*

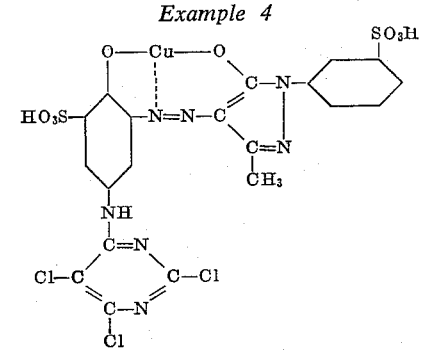

Example 10

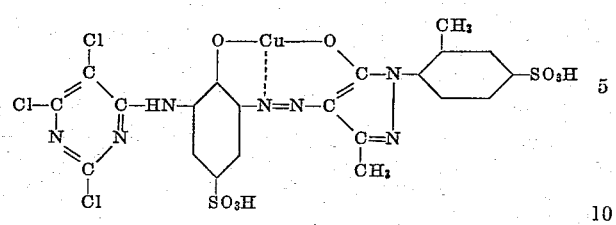

Example 13

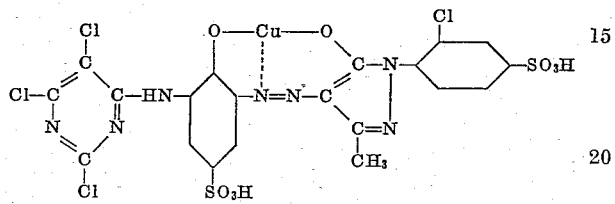

Example 17

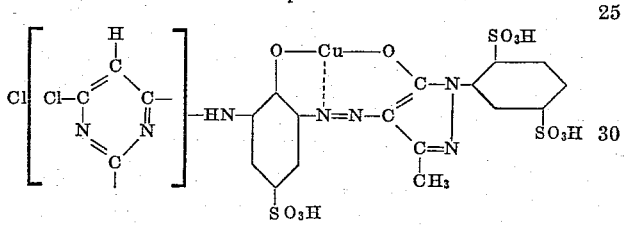

Example 24

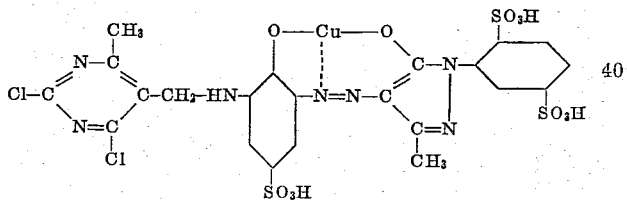

Example 62

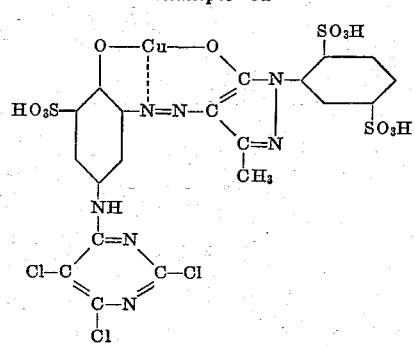

Having thus disclosed the invention what we claim is:
1. The 1:1 copper complex compound of a dye of the formula

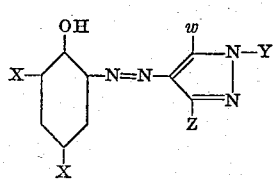

(I)

wherein
w is a member selected from the group consisting of —OH and —NH₂,
Z is a member selected from the group consisting of —CH₃, —COOH and —CO—NH₂,
Y is a member selected from the group consisting of monosulfophenyl, lower alkylmonosulfophenyl, lower alkoxymonosulfophenyl, chloromonsulfphenyl, di-chloromonosulfophenyl, lower alkyl-chloro-monosulfophenyl, disulfophenyl, chloro-disulfophenyl, lower alkyl-disulfophenyl, lower alkoxy-disulfophenyl, monosulfonaphthyl, disulfonaphthyl and trisulfonaphthyl,
one X is —SO₃H,
the second X is a polyhalopyrimidylamino radical of the formula

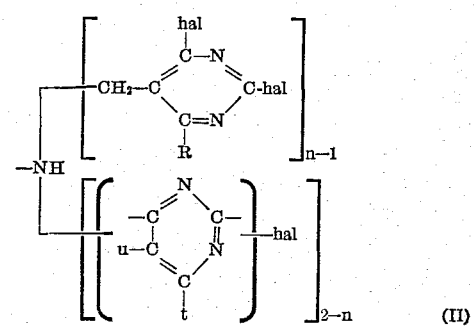

(II)

R is a member selected from the group consisting of hydrogen and methyl,
t is a member selected from the group consisting of chlorine and bromine,
u is a member selected from the group consisting of hydrogen, chlorine and bromine,
hal is a member selected from the group consisting of chlorine and bromine,
and n is one of the integers 1 and 2.

2. The copper complex dye of the formula

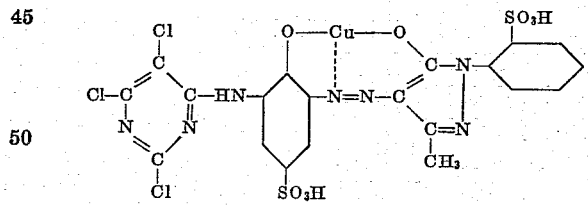

3. The copper complex dye of the formula

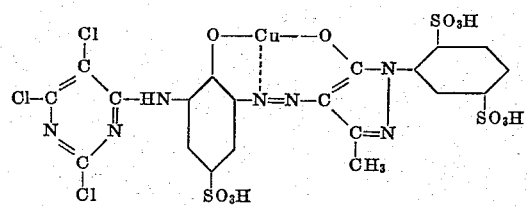

4. The copper complex dye of the formula

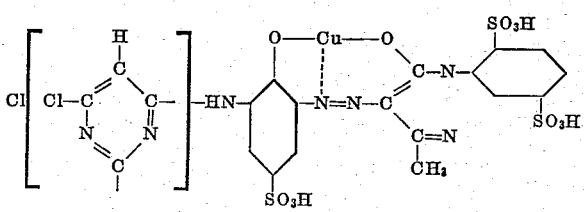

5. The copper complex dye of the formula
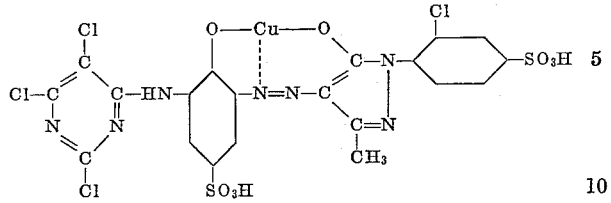
6. The copper complex dye of the formula
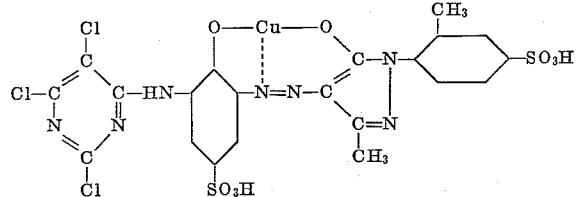
7. The copper complex dye of the formula
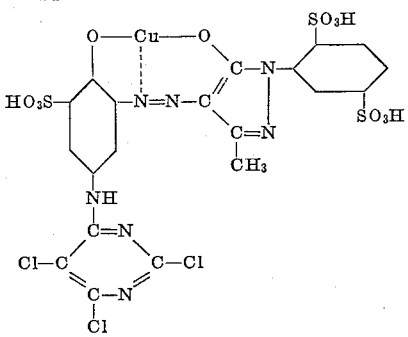
References Cited
UNITED STATES PATENTS
3,127,389  3/1964  Seitz et al. _____ 260—146
FOREIGN PATENTS
214,546  4/1961  Austria.
FLOYD D. HIGEL, *Primary Examiner.*